United States Patent
Khandekar et al.

(10) Patent No.: US 9,215,648 B2
(45) Date of Patent: Dec. 15, 2015

(54) APPARATUS AND METHOD OF INTER-RADIO ACCESS TECHNOLOGY SEARCHING

(75) Inventors: Aamod Dinkar Khandekar, San Diego, CA (US); Jilei Hou, Beijing (CN); Qingxin Chen, Del Mar, CA (US); Xipeng Zhu, Beijing (CN); Jianqiang Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/511,998

(22) PCT Filed: Jun. 17, 2011

(86) PCT No.: PCT/CN2011/075857
§ 371 (c)(1),
(2), (4) Date: Dec. 4, 2013

(87) PCT Pub. No.: WO2012/171215
PCT Pub. Date: Dec. 20, 2012

(65) Prior Publication Data
US 2014/0146742 A1    May 29, 2014

Related U.S. Application Data

(60) Provisional application No. 61/489,969, filed on May 25, 2011.

(51) Int. Cl.
*H04W 48/16* (2009.01)
*H04W 56/00* (2009.01)
(Continued)

(52) U.S. Cl.
CPC ............ *H04W 48/16* (2013.01); *H04B 1/7073* (2013.01); *H04J 11/0083* (2013.01); *H04W 36/0011* (2013.01); *H04W 36/0055* (2013.01); *H04W 36/0061* (2013.01); *H04W 36/0083* (2013.01);
(Continued)

(58) Field of Classification Search
None
See application file for complete search history.

(56) References Cited

U.S. PATENT DOCUMENTS 6,246,673 B1    6/2001    Tiedemann, Jr. et al.
8,577,370 B1 *  11/2013   Mann et al. .................. 455/436
(Continued)

FOREIGN PATENT DOCUMENTS

| CN | 101106394 A | 1/2008 |
| CN | 101610538 A | 12/2009 |
| CN | 101616437 A | 12/2009 |

OTHER PUBLICATIONS

Co-pending U.S. Appl. No. 13/516,656, filed Oct. 4, 2012.
(Continued)

*Primary Examiner* — Christopher Crutchfield
(74) *Attorney, Agent, or Firm* — Kristine U. Ekwueme (57) ABSTRACT

Aspects of radio access technology searching include apparatus and methods for obtaining relative synchronization information between a first radio access technology and a second radio access technology, and determining a time location of a pilot signal of the second radio access technology based on the relative synchronization information. Further aspects include searching for the pilot signal of the second radio access technology using the determined time location. Other aspects further include determining a measurement gap duration and measurement gap location based on the relative synchronization information so as to encompass a pilot of the second radio access technology.

28 Claims, 9 Drawing Sheets

(51) Int. Cl.
  *H04W 36/00* (2009.01)
  *H04B 1/7073* (2011.01)
  *H04J 11/00* (2006.01)
  *H04W 88/06* (2009.01)
  *H04B 1/707* (2011.01)

(52) U.S. Cl.
  CPC ... *H04W 56/001* (2013.01); *H04B 2001/70724* (2013.01); *H04W 88/06* (2013.01)

(56) References Cited

U.S. PATENT DOCUMENTS

| | | | |
|---|---|---|---|
| 2006/0003769 A1* | 1/2006 | Liu et al. | 455/436 |
| 2006/0009246 A1* | 1/2006 | Marinier et al. | 455/502 |
| 2006/0223557 A1* | 10/2006 | Manohar | 455/502 |
| 2007/0037601 A1* | 2/2007 | Mittal et al. | 455/525 |
| 2009/0280802 A1* | 11/2009 | Chin et al. | 455/426.1 |
| 2010/0029295 A1 | 2/2010 | Touboul et al. | |
| 2011/0053595 A1* | 3/2011 | Snow et al. | 455/436 |
| 2012/0218946 A1* | 8/2012 | Ohshima et al. | 370/328 |
| 2013/0028126 A1* | 1/2013 | Kazmi | 370/252 |

OTHER PUBLICATIONS

International Search Report and Written Opinion—PCT/CN2011/075857—ISA/EPO—Mar. 22, 2012.

International Search Report and Written Opinion—PCT/US2012/039731—ISA/EPO—Feb. 15, 2013.

* cited by examiner

APPARATUS AND METHOD OF INTER-RADIO ACCESS TECHNOLOGY SEARCHING

CLAIM OF PRIORITY UNDER 35 U.S.C. §119

The present Application for Patent claims priority to:
U.S. Provisional Application No. 61/489,969 entitled "APPARATUS AND METHOD OF INTER-RADIO ACCESS TECHNOLOGY SEARCHING" filed May 25, 2011; and
International Application No. PCT/CN2011/075857, entitled "APPARATUS AND METHOD OF INTER-RADIO ACCESS TECHNOLOGY SEARCHING" filed Jun. 17, 2011;
both assigned to the assignee hereof and both hereby expressly incorporated by reference herein.

BACKGROUND

1. Field

Aspects of the present disclosure relate generally to wireless communication systems, and more particularly, to apparatus and methods of searching for radio access technologies.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

For example, one problem relates to finding an alternate radio access technology, such as when a handover or reselection is desired. Often the timing of a base station (or node B, eNodeB, etc.) is not known. As such, a user equipment may need to perform a full system acquisition search based on many different hypotheses, which may be time consuming To reduce latency, some system acquisition searches include less than a full search. In any system acquisition search, though, there is a tradeoff between missed detections and false alarms.

Thus, improvements in system acquisition searching are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of radio access technology searching includes obtaining, by a processor, relative synchronization information between a first radio access technology and a second radio access technology, and determining a time location of a pilot signal of the second radio access technology based on the relative synchronization information. Further, in an aspect performed by a user equipment, the method may include searching for the pilot signal of the second radio access technology using the determined time location.

One or more related aspects may include: a computer program product that includes a non-transitory computer-readable medium having code for performing the actions of the above-noted method; an apparatus for wireless communication that includes one or more means for performing the above-noted method; or, an apparatus for wireless communication that includes at least one processor, and a memory coupled to the at least one processor, wherein the at least one processor is configured to perform the actions of the above-noted method.

In another aspect, after obtaining the relative synchronization information between the first radio access technology and the second radio access technology, the method may include determining a measurement gap duration and measurement gap location based on the relative synchronization information so as to encompass a pilot of the second radio access technology. In some cases, the aspect of this method may be performed, but is not limited to, a network entity.

One or more related aspects may include: a computer program product that includes a non-transitory computer-readable medium having code for performing the actions of the above-noted method; an apparatus for wireless communication that includes one or more means for performing the above-noted method; or, an apparatus for wireless communication that includes at least one processor, and a memory coupled to the at least one processor, wherein the at least one processor is configured to perform the actions of the above-noted method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
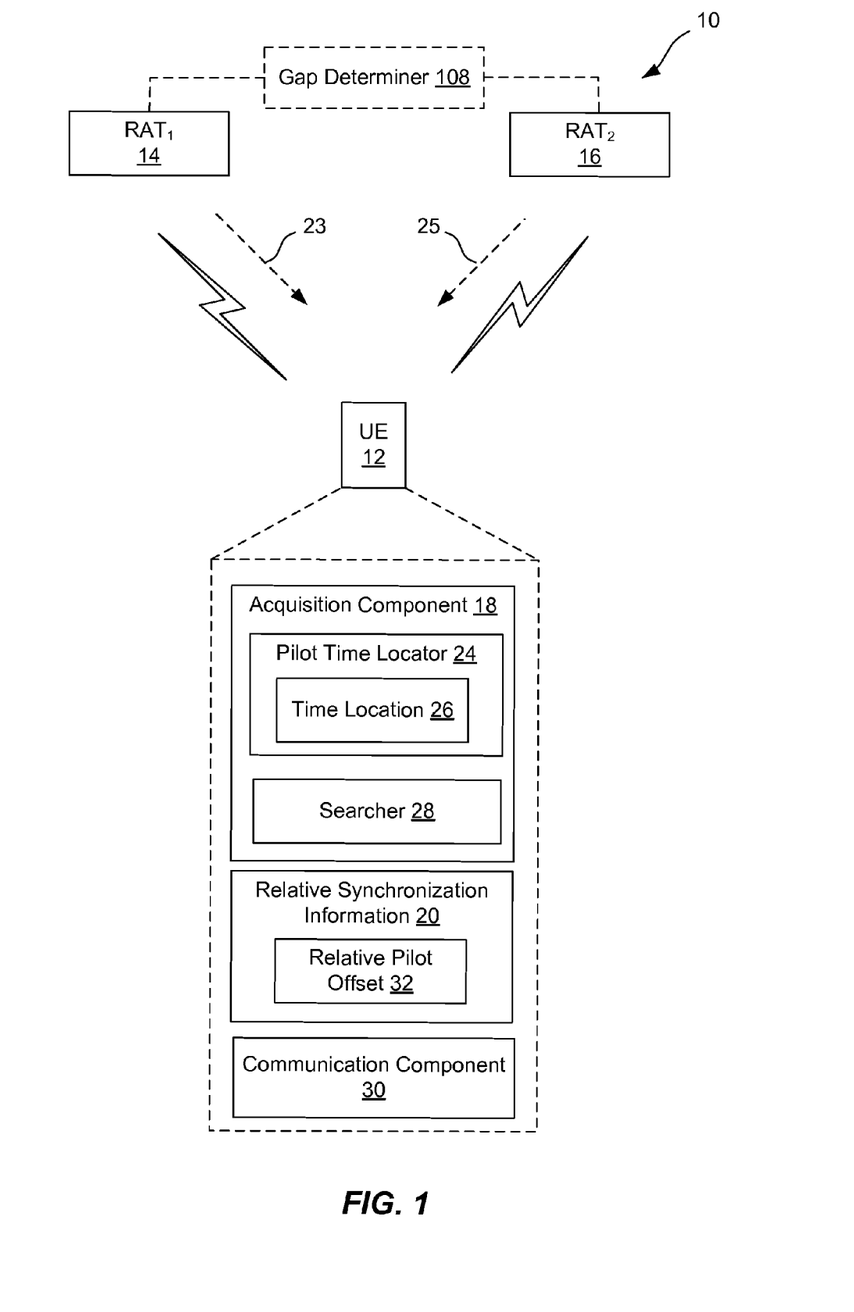
FIG. 1 is a schematic diagram of an aspect of a system for inter-radio access technology searching.

Referring to FIG. 1, one aspect of system 10 that may provide relatively fast inter-radio access technology searching includes a user equipment (UE) 12 in communication with a first radio access technology (RAT1) node 14 and desirous of acquiring a second radio access technology (RAT2) node 16. For example, UE 12 may want to acquire RAT2 16 for performing actions such as, but not limited to, a circuit switched fall back, a handover of a session, or an idle mode cell reselection. Moreover, for example, RAT1 14 and RAT2 16 may operate as synchronous radio access technologies.

In an aspect, UE 12 includes an acquisition component 18 that obtains relative synchronization information 20 between RAT1 14 and RAT2 16. For example, relative synchronization information 20 may include, but is not limited to, a relative pilot offset 22 between a pilot signal 23 of RAT1 14 and a pilot signal 25 of RAT2 16.

Further, in an aspect, acquisition component 18 may include a pilot time locator 24 that includes an algorithm that takes into account the synchronization between RAT1 14 and RAT2 16 to determine a time location 26 of pilot signal 25 of RAT2 16 based on relative synchronization information 20. For example, as UE 12 is in communication with RAT1 14, pilot time locator 24 knows a timing of pilot signal 23 of RAT1 14, and thus can execute the algorithm to determine an estimation of time location 26 of pilot signal 25 of RAT2 16 based on relative pilot offset 22.

Moreover, acquisition component 18 may include a searcher 28 that operates a communication component 30 to search for pilot signal 25 of RAT2 16 using time location 26. For example, searcher 28 may operate a receiver portion of communication component 30 to tune to a frequency corresponding to pilot signal 25 of RAT2 16 for a duration of time that includes time location 26.

Thus, as compared to performing a full system acquisition search for pilot signal 25 of RAT2 16, the apparatus and methods of system 10 and UE 12 allow for the possibility of a reduced search by utilizing relative synchronization information 20 to help locate pilot signal 25 of RAT2 16. For example, a full system acquisition search may utilize eight measurement gaps, while the improved search defined by the present aspects may utilize one or two measurement gaps. As a result, the apparatus and methods of system 10 and UE 12 may provide a relatively faster (as compared to prior methodologies) acquisition time, thereby reducing latency in setting up communications with RAT2 16 and also thereby improving resource utilization on RAT1 12 based on the reduced time spent searching and measuring for pilot signal 25 of RAT2 16.

Figure 2:
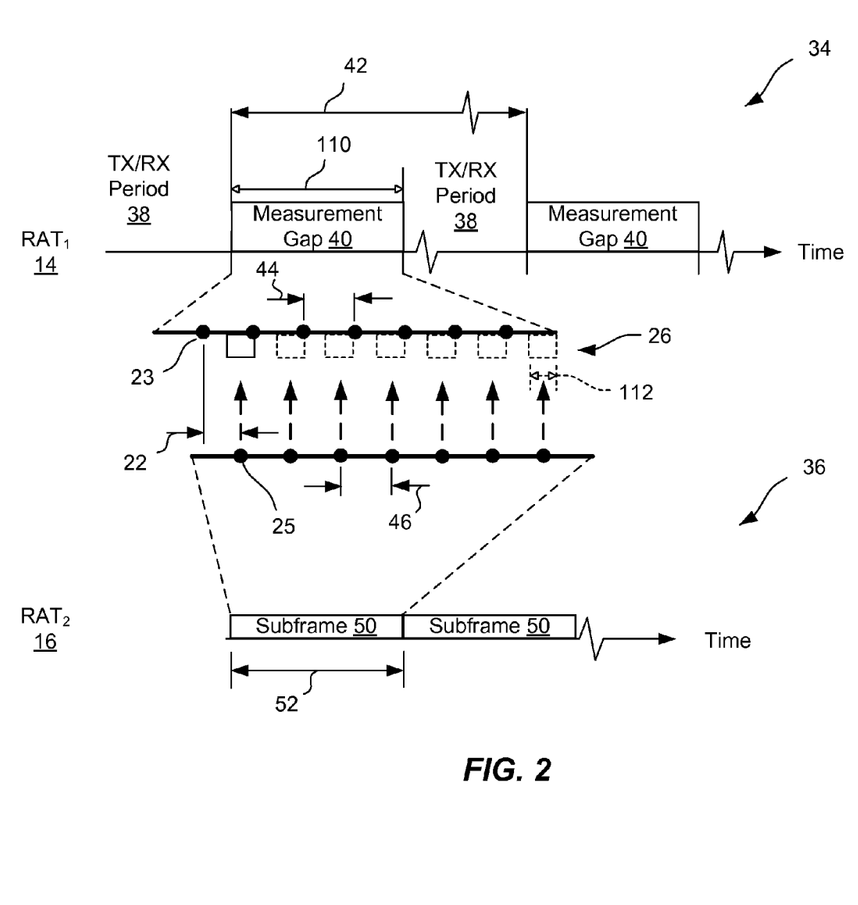
FIG. 2 is a diagram of relative timing in a first radio access technology and a second radio access technology.

Referring to FIG. 2, one example, which should not be construed as limiting, of a use case of system 10 of FIG. 1 can be further explained with reference to timing diagram 34 corresponding to RAT1 14 and timing diagram 36 corresponding to RAT2 16. In particular, communication component 30 (FIG. 1) communicates with RAT1 14 according to timing diagram 34, which includes one or more transmit and/or receive periods 38 corresponding to RAT1 14 and one or more measurement gaps 40 that occur with a given periodicity 42 over time. Each measurement gap 40 includes one or more time locations 26, e.g. which may include a duration of time, determined by pilot time locator 24 (FIG. 1) to be aligned with a corresponding one or more pilot signals 25 of RAT2 16. Each pilot signal 25 of RAT2 16 is related to a corresponding one of one or more pilot signals 23 of RAT1 14 according to relative pilot offset 22 (although, for the sake of simplicity, only one pilot offset 22 is illustrated in FIG. 2). For example, in one aspect, a plurality of pilot signals 23 of RAT1 14 have a pilot period 44, while a plurality of pilot signals 25 of RAT2 16 have a pilot period 46, and pilot time locator 24 (FIG. 1) applies relative pilot offset 22 to each of the plurality of pilot signals 23 of RAT1 14 to determine a plurality of time locations 26 corresponding to each of the plurality of pilot signals 25 of RAT2 16. It is noted that in some cases, pilot period 44 and pilot period 46 may be a same time period, while in other cases pilot period 44 and pilot period 46 may be a different time period.

Moreover, it is noted that duration 48 of each time location 26 encompasses each of the plurality of pilot signals 25 of RAT2 16. In an aspect, for example, pilot time locator 24 may calculate duration 48 to enable providing sufficient time for communications component 30 to set up a receiver to measure each of the plurality of pilot signals 25 of RAT2 16. Further, for example, pilot time locator 24 may calculate duration 48 to include some amount of time before and/or after a specific time offset from the time of each pilot signal 23 to allow for drift of pilot signals 23 or error in the calculation of time location 26.

Further, for example, in some aspects, each of the plurality of pilot signals 25 of RAT2 16 may be transmitted as part of a subframe 50, which may have a given periodicity 52.

Figure 3:
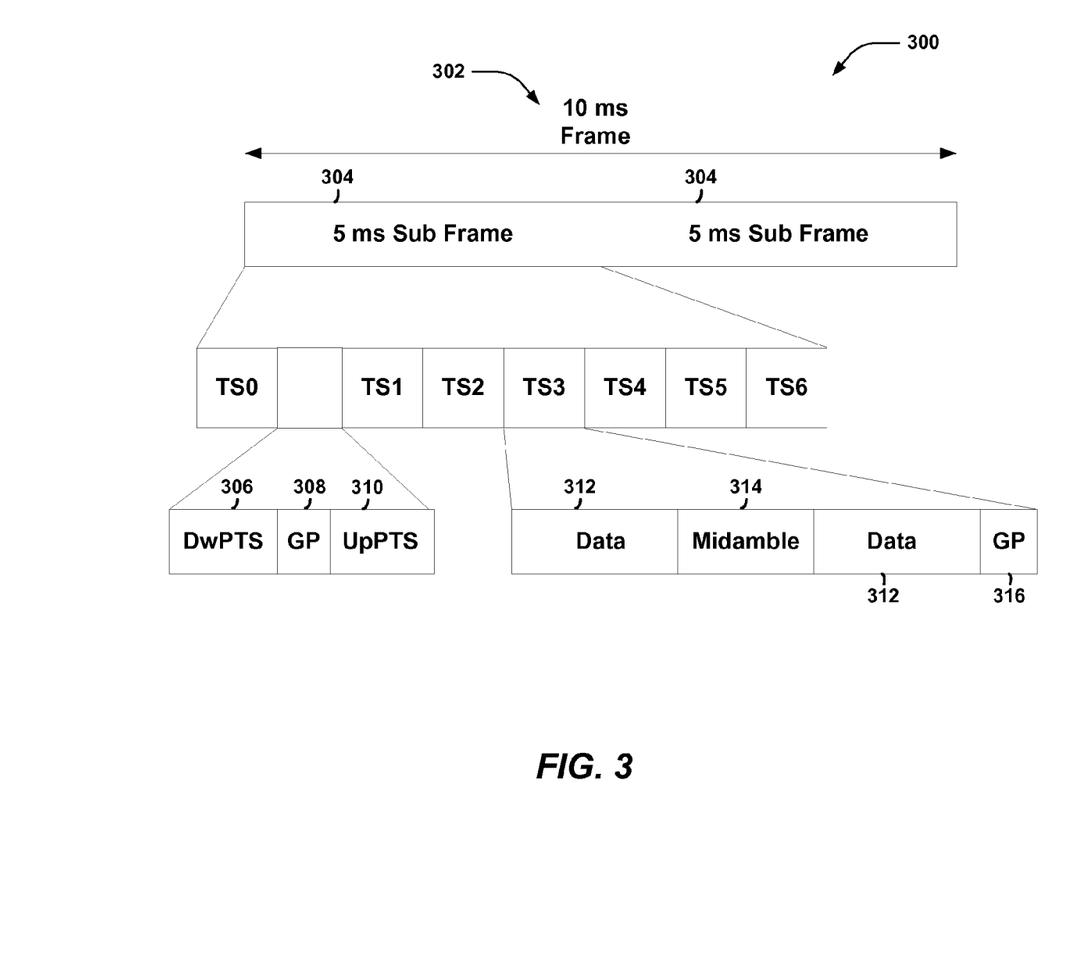
FIG. 3 is a block diagram conceptually illustrating an example of a frame structure in a telecommunications system.

Referring to FIG. 3, for example, in one particular use case that should not be construed as limiting, RAT2 16 (FIGS. 1 and 2) may be a TD-SCDMA technology and each of the plurality of pilot signals 25 of RAT2 16 may be transmitted as part of a carrier having a frame structure 60. The TD-SCDMA carrier, as illustrated, has a frame 62 that is 10 milliseconds (ms) in length. The frame 62 has two 5 ms subframes 64 (e.g. similar to or the same as subframes 40 in FIG. 2), and each of the subframes 64 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 66, a guard period (GP) 68, and an uplink pilot time slot (UpPTS) 70 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 72 separated by a midamble 74 and followed by a guard period (GP) 76. The midamble 74 may be used for features, such as channel estimation, while the GP 76 may be used to avoid inter-burst interference.

Figure 4:
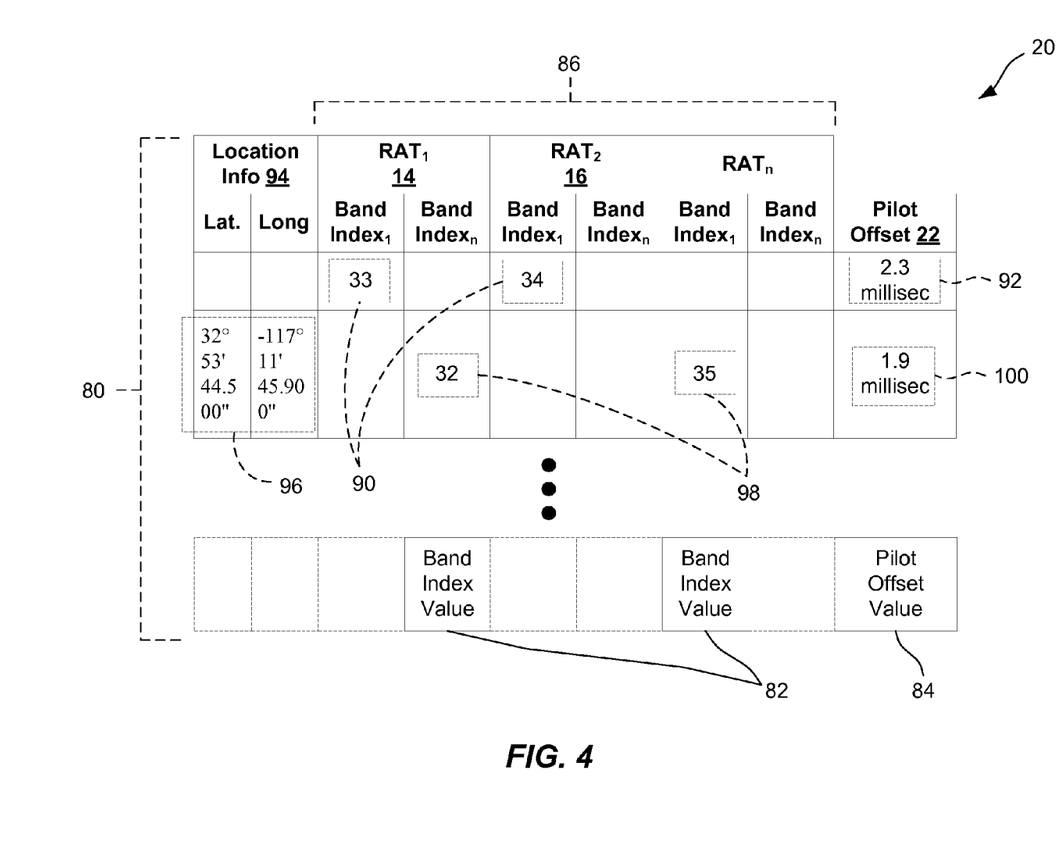
FIG. 4 is a diagram representing an aspect of a table or relational database structure that includes relative synchronization information.

Referring to FIG. 4, in one aspect that should not be construed as limiting, relative synchronization 20 (see also FIG. 1) may be stored on UE 12 (FIG. 1) in the form of data in a table or in a relational database 80 that defines an identified pair of radio access technologies 82 and corresponding relative pilot offset value 84. It is noted that table or relational database 80 may include any number of pairs of radio access technologies 82, including any combination of two radio access technologies (e.g. technologies from 1 to n, where n is a positive integer), and corresponding relative pilot offset values 84.

In some aspects, relative synchronization information 20 between two radio access technologies may be band specific. For example, for at least two of a plurality of radio access technologies 86 in table or relational database 80, any number, n, of band indexes 88 may be included. As such, relative synchronization information 20 in this aspect may include a pair of identified band index values 90 and a corresponding relative pilot offset value 92.

Alternatively, or in addition, relative synchronization information 20 between two radio access technologies may be location specific. For example, for at least two of the plurality of radio access technologies 86 in table or relational database 80, relative synchronization information 20 in this aspect may include location information 94 having a location value 96, along with a pair of identified band index values 98 and a corresponding relative pilot offset value 100. It is noted that location information 94 may include any type of data that defines a position and/or location of UE 12 (FIG. 1), such as latitude and longitude, one or more network node (e.g. base station, eNodeB, network access point, etc.) identifiers, etc. UE 12 (FIG. 1) may obtain location information 94, for example, via a position/location component on UE 12 that operates in conjunction with a satellite based system, e.g. Global Positioning System (GPS), or a terrestrial network-based system, e.g. a cellular system, or a combination of both. In other words, location information 94 may be generated locally on UE 12, obtained from a network entity, or some combination of both.

Figure 5:
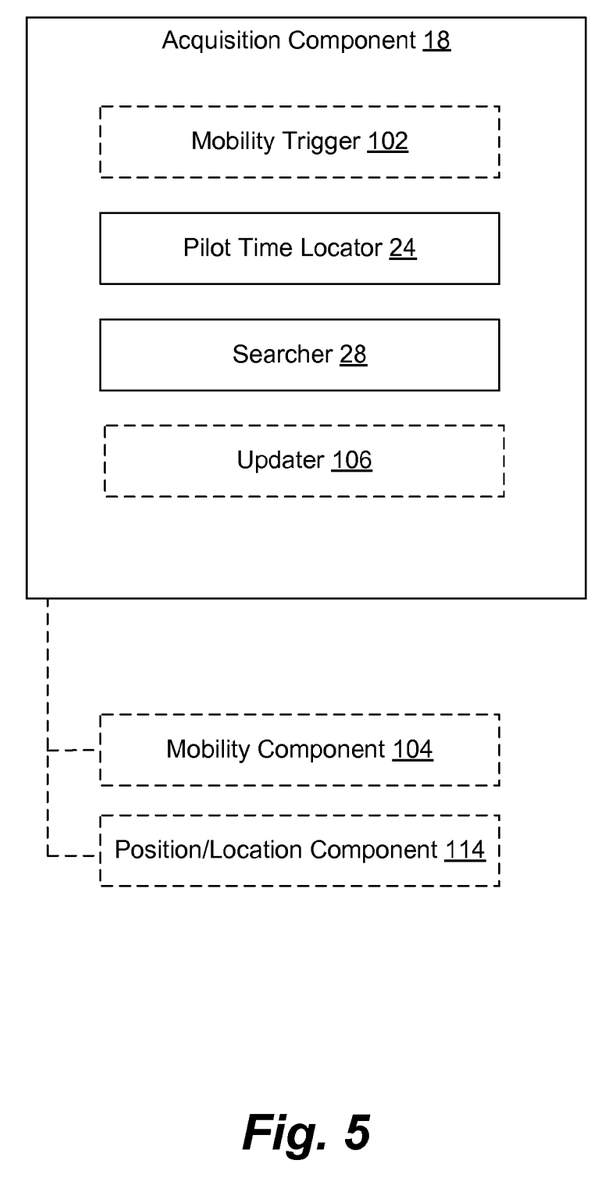
FIG. 5 is a schematic block diagram of an aspect of an acquisition component and optional associated components.

Referring to FIG. 5, in an aspect that should not be construed as limiting, acquisition component 18 (see also FIG. 1) may include or be in communication with one or more additional components. For example, as mentioned above, in an aspect, acquisition component 18 may be triggered to perform the above-described actions based on receiving or detecting mobility trigger 102. For example, mobility trigger 102 may include, but is not limited to, one or more of a circuit switched fall back, a handover of a communication session and/or call, or an idle mode cell reselection. Further, for example, mobility trigger 102 may be generated by and/or received from a mobility component 104 on UE 12 (FIG. 1). For example, mobility component 104 may include one or more of hardware, software, firmware and/or algorithms and protocols for maintaining network communications.

Further, in an aspect, acquisition component 18 may further include an updater component 106 that operates to maintain current and valid synchronization information 20 (FIG. 1), such as in table or relational database 80 (FIG. 4). In an aspect, updater component 106 may include one or more of hardware, software, firmware and/or algorithms and protocols for updating relative synchronization information 20 (FIG. 1) using occasional and/or periodic full system acquisition searches. For example, the occasional and/or periodic full system acquisition searches may be performed with a relative low periodicity, e.g. once every few minutes, when UE 12 (FIG. 1) is camped on RAT1 14 (FIG. 1). The relatively low periodicity may include a recurring time interval that is long enough to have relatively little impact on a battery life of a battery on UE 12, while being short enough to maintain relatively new and valid relative synchronization information 20 (FIG. 1). As such, the value of the relatively low periodicity may be configurable by a wireless network operator/carrier, and/or by a manufacturer of UE 12 (FIG. 1) or a portion thereof, such as acquisition component 18.

Additionally, as noted above with respect to FIG. 4, acquisition component 18 may communicate with a position/location component 114 (FIG. 5) on UE 12 (FIG. 5). Position/location component 114 may include one or more of hardware, software, firmware and/or algorithms and protocols for determining or receiving location information 94 (FIG. 4).

Figure 6:
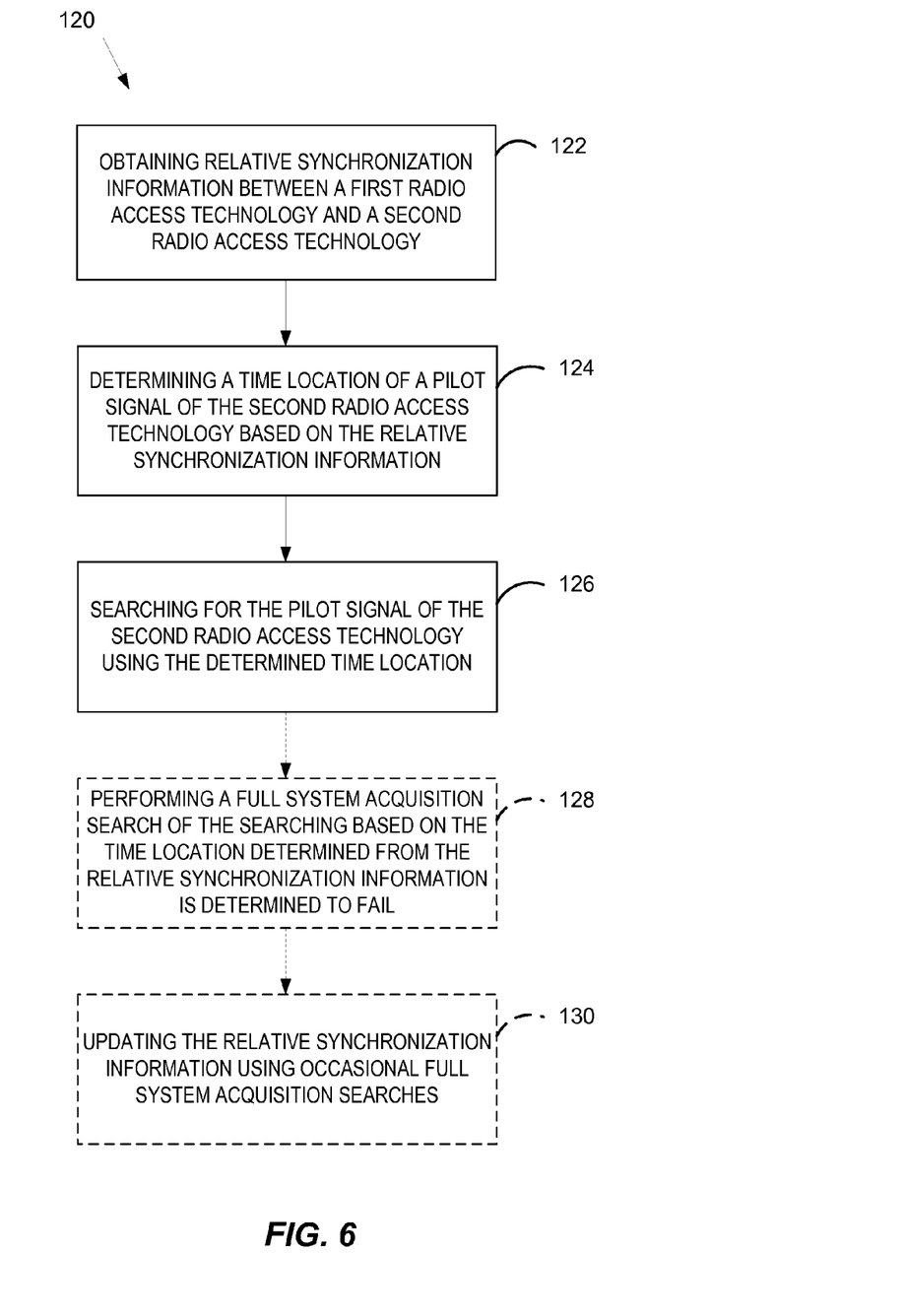
FIG. 6 is a flow chart of an aspect of a method of inter-radio access technology searching performed by a user equipment.

Referring to FIG. 6, in operation, a user equipment may perform a method 120 of radio access technology searching. In an aspect, for example, method 120 includes obtaining, by a user equipment, relative synchronization information between a first radio access technology and a second radio access technology (Block 122). For example, in an aspect, acquisition component 18 may obtain the relative synchronization information from a table or relational database maintained or otherwise stored in a memory of UE 12 (FIG. 1). For example, UE 12 may be preconfigured with the relative synchronization information, or may obtain the relative synchronization over-the-air via a receiver or transceiver, e.g. from a network or system message. Also, in an aspect, the relative synchronization information may be band specific, e.g. specific to different bands of the first radio access technology and the second radio access technology, such as RAT1 14 and RAT2 16 of FIG. 1. Alternatively or in addition, in an aspect, the relative synchronization information may be location specific, e.g. dependent upon a current location of UE 12 (FIG. 1).

Further, method 120 includes determining a time location of a pilot signal of the second radio access technology based on the relative synchronization information (Block 124). For example, in an aspect, pilot locator component 24 (FIG. 1) may execute to determine time location 26 (FIG. 2) of one or more pilot signals 25 (FIG. 2) of RAT2 16 (FIG. 2). Optionally, in an aspect, the determining may further include obtaining and/or determining a measurement gap having a reduced duration that is based on the time locations determined according to the synchronization information. For example, in this aspect, UE 12 or acquisition component 18 or some network entity may further include a gap determiner 108 (FIG. 1) to determine the location and duration of the reduced size measurement gaps, as is discussed in more detail below.

Additionally, method 120 includes searching for the pilot signal of the second radio access technology using the determined time location (Block 126). For example, in an aspect, UE 12 (FIG. 1) and/or acquisition component 18 (FIG. 1) may include a searcher component 28 (FIG. 1) for performing the searching. Further, in an aspect, the search is carried out in measurement gaps, e.g. measurement gaps 40 (FIG. 2), defined by the first radio access technology, e.g. RAT1 14 (FIG. 2). Additionally, in an aspect, the searching based on the time location determined from the relative synchronization information takes fewer measurement gaps as compared to a search not utilizing the relative synchronization information. Optionally, in an aspect, the searching may be triggered by a mobility trigger, such as but not limited to a circuit switched fall back, a handover, a cell reselection, etc. Optionally, in an aspect, the searching may include searching in the obtained and/or determined measurement gap having a reduced duration that is based on the time locations determined according to the synchronization information. For example, in this aspect, UE 12 or acquisition component 18 or some other network entity may further include a gap determiner 108 (FIG. 1) to determine the location and duration of the reduced size measurement gaps, as is discussed in more detail below.

Optionally, method 120 may further include performing a full system acquisition search of the searching based on the time location determined from the relative synchronization information is determined to fail (Block 128). For example, in an aspect, UE 12 and/or acquisition component 18 and/or searcher 28 (FIG. 1) may include hardware, software, firmware, algorithms or protocols for determining that the searching based on the determined time location has failed, e.g. a failed search, and then directing the performance of a full system acquisition search.

In another option, method 120 may further include updating the relative synchronization information using occasional and/or periodic full system acquisition searches (Block 130). For example, in an aspect, UE 12 and/or acquisition component 18 (FIG. 1) may include an updater 106 (FIG. 8) that includes hardware, software, firmware, algorithms or protocols for performing a full system acquisition search at occasional periodic intervals.

Figure 7:
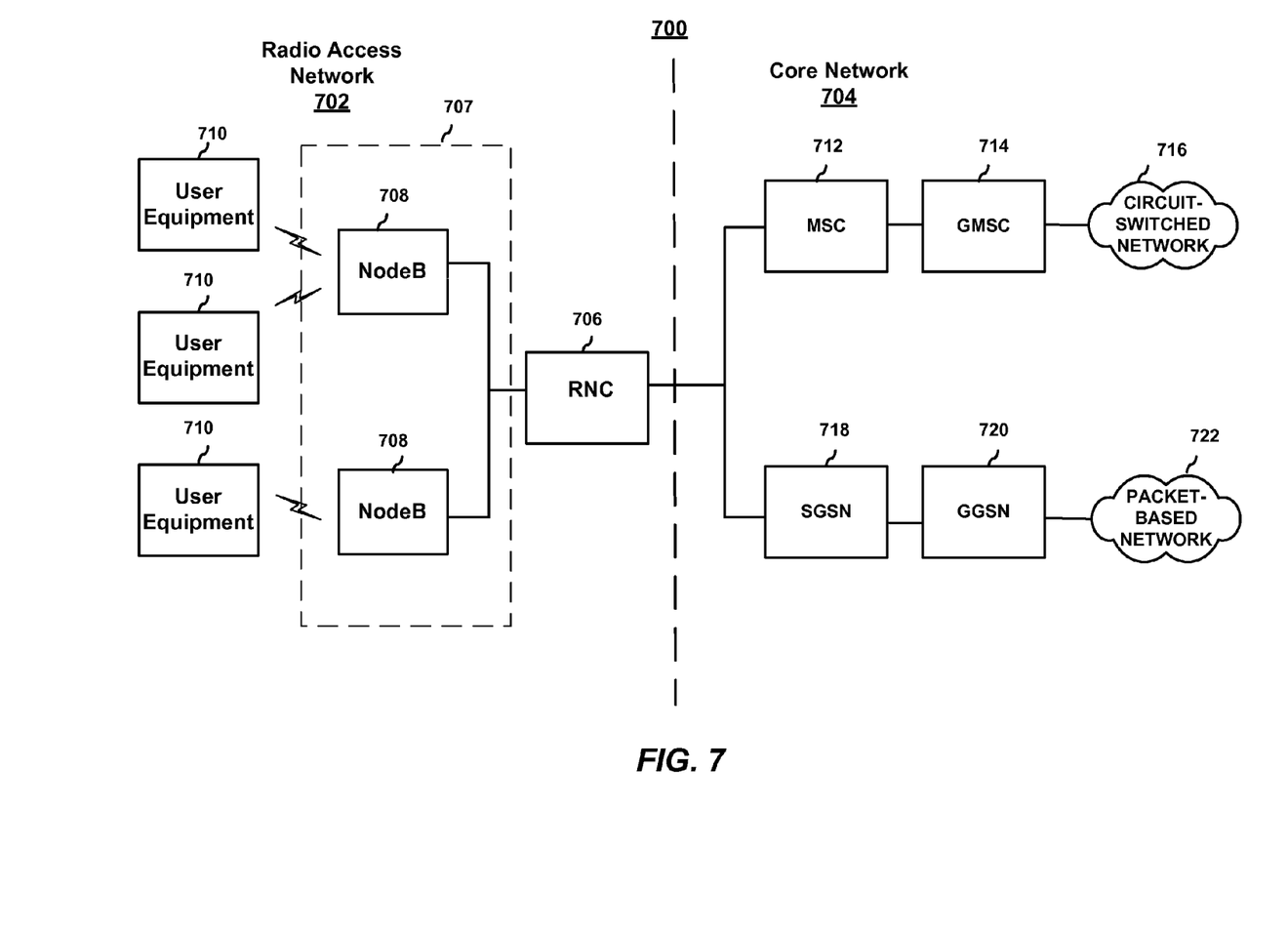
FIG. 7 is a block diagram conceptually illustrating an example of a telecommunications system.

Referring to FIG. 7, a block diagram is shown illustrating an example of a telecommunications system 700 in which one or more UEs 710, such as UE 12 of FIG. 1, may operate. The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system employing a TD-SCDMA standard. In this example, the UMTS system includes a (radio access network) RAN 702 (e.g., UTRAN) that provides various wireless services including telephony, video, data, messaging, broadcasts, and/or other services. The RAN 702 may be divided into a number of Radio Network Subsystems (RNSs) such as an RNS 707, each controlled by a Radio Network Controller (RNC) such as an RNC 706. For clarity, only the RNC 706 and the RNS 707 are shown; however, the RAN 702 may include any number of RNCs and RNSs in addition to the RNC 706 and RNS 707. The RNC 706 is an apparatus responsible for, among other things, assigning, reconfiguring and releasing radio resources within the RNS 707. The RNC 706 may be interconnected to other RNCs (not shown) in the RAN 702 through various types of interfaces such as a direct physical connection, a virtual network, or the like, using any suitable transport network.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 708 are shown; however, the RNS 707 may include any number of wireless Node Bs. The Node Bs 708 provide wireless access points to a core network 704 for any number of mobile apparatuses, such as UE 12. Further examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. As described, the mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, UE 12 is shown in communication with at least one of the Node Bs 708. The downlink (DL), also called the forward link, refers to the communication link from a Node B to a UE, and the uplink (UL), also called the reverse link, refers to the communication link from a UE to a Node B.

The core network 704, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 704 supports circuit-switched services with a mobile switching center (MSC) 712 and a gateway MSC (GMSC) 714. One or more RNCs, such as the RNC 106, may be connected to the MSC 712. The MSC 712 is an apparatus that controls call setup, call routing, and UE mobility functions. The MSC 712 also includes a visitor location register (VLR) (not shown) that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard GSM circuit-switched data services. The GGSN 720 provides a connection for the RAN 102 to a packet-based network 722. The packet-based network 722 may be the Internet, a private data network, or some other suitable packet-based network. One function of the GGSN 720 is to provide UE 12 with packet-based network connectivity. Data packets are transferred between the GGSN 720 and UE 12 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 708 and UE 12, but divides uplink and downlink transmissions into different time slots in the carrier.

Figure 8:
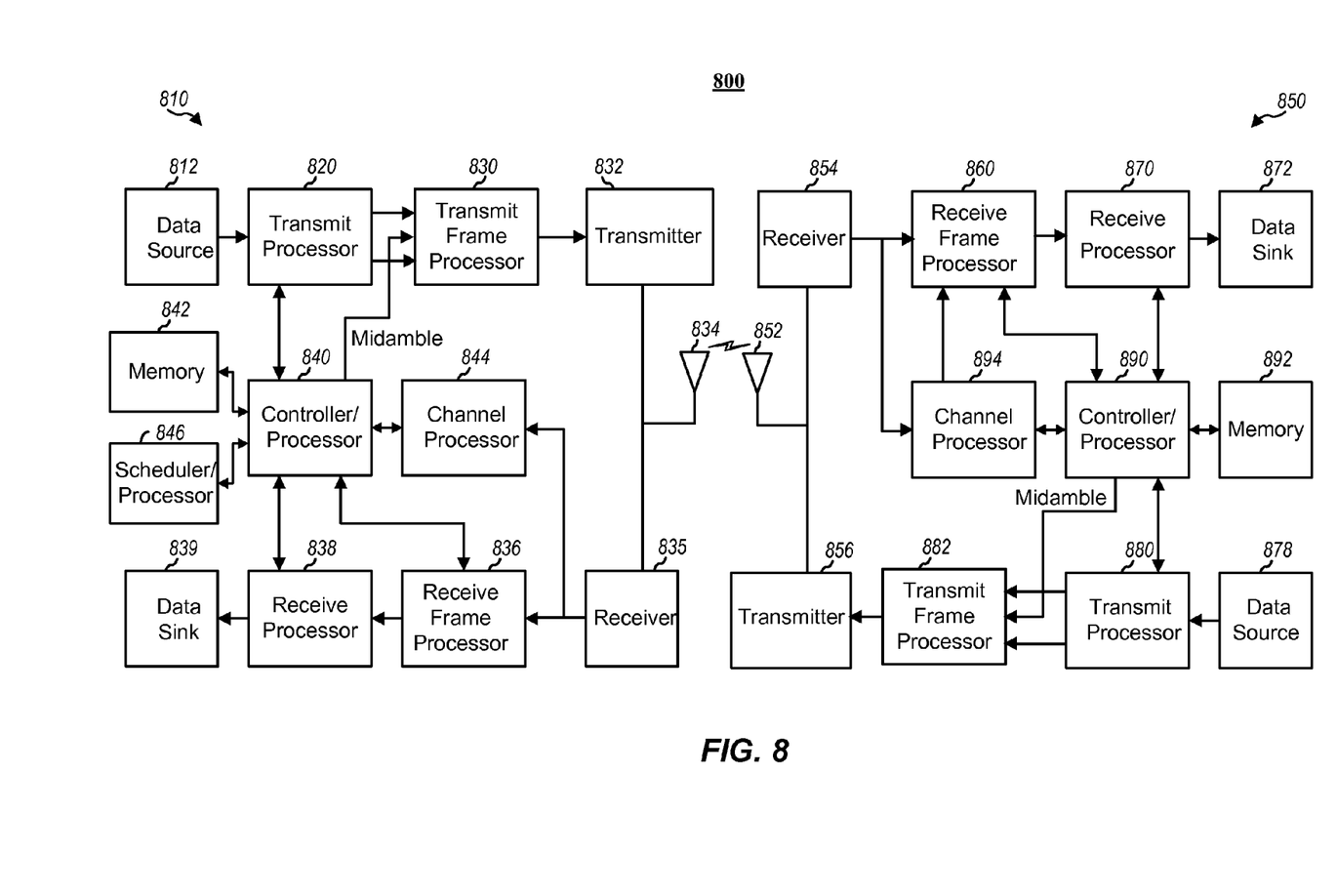
FIG. 8 is a block diagram conceptually illustrating an example of a Node B in communication with a UE in a telecommunications system.

Referring to FIG. 8, in one aspect, a Node B 310 in communication with a UE 350 in a RAN 300, where the RAN 800 may be the RAT2 16 in FIG. 1, the Node B 310 may be RAT1 14 in FIG. 1, and UE 350 may be UE 12 in FIG. 1. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback contained in the midamble 314 (FIG. 3) from the UE 850. The symbols generated by the transmit processor 820 are provided to a transmit frame processor 830 to create a frame structure. The transmit frame processor 830 creates this frame structure by multiplexing the symbols with a midamble 314 (FIG. 3) from the controller/processor 840, resulting in a series of frames. The frames are then provided to a transmitter 832, which provides various signal conditioning functions including amplifying, filtering, and modulating the frames onto a carrier for downlink transmission over the wireless medium through smart antennas 834. The smart antennas 834 may be implemented with beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides the midamble 314 (FIG. 3) to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with a midamble 314 (FIG. 3) from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides the midamble 314 (FIG. 3) to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

Referring back to FIG. 6, it is noted that in an aspect of method 120 the first and second radio access technologies may be RAT1 14 and RAT2 16 of FIG. 1.

Further, in an aspect, the actions blocks 122, 124, and 126 of method 120 may be performed by UE 12 (FIG. 1) or UE 850 (FIG. 8). In an aspect, controller/processor 890 (FIG. 8), e.g. for UE 850, may control the actions of method 120, such as described by blocks 122, 124, and 126. Moreover, the computer readable media of memory 892 may store data and software for UE 850, e.g. UE 12 (FIG. 1), to perform these actions.

In one configuration, for example, the apparatus 850 for wireless communication includes means for obtaining relative synchronization information between a first radio access technology and a second radio access technology, means for determining a time location of a pilot signal of the second radio access technology based on the relative synchronization information, and means for searching for the pilot signal of the second radio access technology using the determined time location. In one aspect, the aforementioned means may be the processor 890 (FIG. 8) configured to perform the functions recited by the aforementioned means. In another aspect, the aforementioned means may be a module, instructions stored on a computer-readable medium, or any apparatus, such as acquisition component 18, configured to perform the functions recited by the aforementioned means.

Referring back to FIGS. 1 and 2, in an optional aspect, system 10 may also include a gap determiner component 108 that operates to calculate and/or adjust a value and/or location of measurement gap 40 (FIG. 2). For example, gap determiner component 108 may be a network entity in communication with RAT1 14 and/or RAT2 16, or gap determiner component 108 may be integral with RAT1 14 and/or RAT2 16. In other aspects, gap determiner component 108 may be located on or in communication with UE 12 (FIG. 1). In an aspect, gap determiner component 108 may include one or more of hardware, software, firmware and/or algorithms and protocols for analyzing an initial measurement gap duration 110 (FIG. 2) and relative time location and periodicity 42 of measurement gap 40, and determining whether or not to modify any of these characteristics. For example, in an aspect, gap determiner component 108 may obtain relative synchronization information 20 from UE 12 and/or from a memory or relational database, which allows gap determiner component 108 to identify one or more time locations 26 (FIG. 2) of a corresponding one or more pilot signals 25 of RAT2 16 (FIG. 2). As such, gap determiner component 108 may include an algorithm to adjust initial measurement gap duration 110 to be a relatively smaller value, such as a new measurement gap duration 112 (FIG. 2), which may correspond to a time period that encompass a single pilot signal 25, or in some cases more than one pilot signals 25 of RAT2 16 (FIG. 2). In some aspects, for example, gap determiner component 108 may execute algorithm to calculate new measurement gap duration 112 to be the same or similar to a duration of time location 26. Moreover, the algorithm of gap determiner component 108 may function to define a plurality of new measurement gap durations 112 to correspond to each of the plurality of pilot signals 25 of RAT2 16 (FIG. 2), at least to the extent of the time locations 26 as determined by UE 12. Accordingly, gap determiner component 108 may further communicate new measurement gap duration 112, or a plurality of new measurement gap durations 112, to UE 12 and/or to acquisition component 18 for use by searcher 28 in searching for the pilot signal 25 of RAT2 16.

Figure 9:
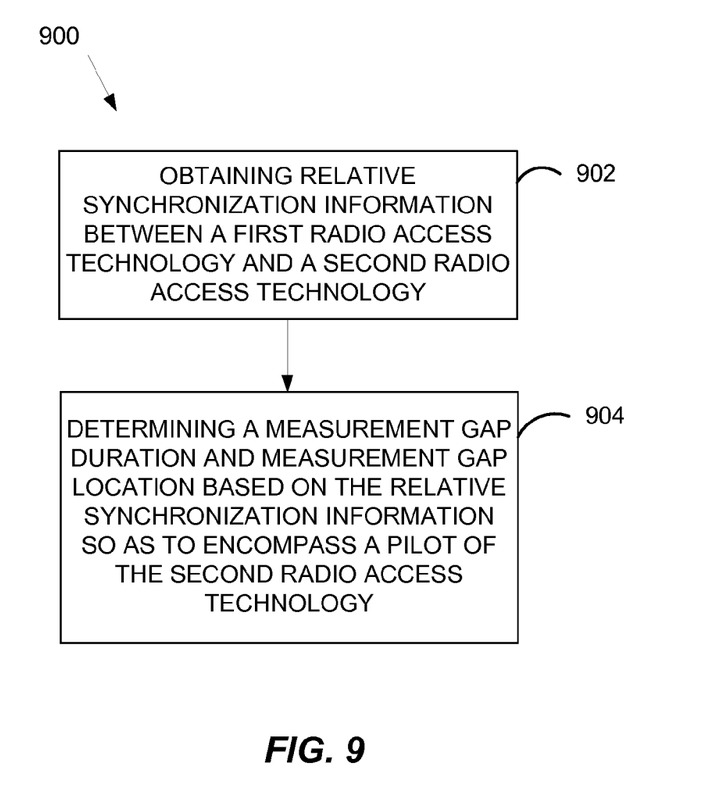
FIG. 9 is a flow chart of an aspect of a method of inter-radio access technology searching performed by a network entity.

Referring to FIG. 9, in operation, gap determiner component 108 associated with a network entity, such as RAT1 14 or RAT2 16, or located on or in communication with UE 12, may perform a method 900 of radio access technology searching. In an aspect, method 900 may include obtaining relative synchronization information between a first radio access technology and a second radio access technology (Block 902). In an aspect, for example, the synchronization information may be provided to gap determiner component 108 by one or more user equipment, such as UE 12 (FIG. 1), or may be accessed from a memory or relational database on UE 12 by gap determiner component 108.

Additionally, method 900 may include determining a measurement gap duration and measurement gap location based on the relative synchronization information so as to encompass a pilot of the second radio access technology (Block 904). In an aspect, for example, gap determiner component 108 may execute an algorithm to determine a new measurement gap duration that may be less than a pilot periodicity of the second radio access technology.

Optionally, method 900 may further include communicating new measurement gap duration 112, or a plurality of new measurement gap durations 112, from gap measurement component 108 to UE 12 and/or to acquisition component 18 for use by searcher 28 in searching for the pilot signal 25 of RAT2 16.

In an aspect of method 900, the first and second radio access technologies may be RAT1 14 and RAT2 16 of FIG. 1.

Further, in an aspect, controller/processor 840 (FIG. 8), e.g. for RAT2 16 (FIG. 1), may control the actions of blocks 902 and 904. Moreover, the computer readable media of memory 842 may store data and software for Node B 810, e.g. of RAT2 16 (FIG. 1) to perform these actions. In other aspects, controller/processor 890 (FIG. 8), e.g. for UE 12 (FIG. 1), may control the actions of blocks 902 and 904. Moreover, the computer readable media of memory 892 may store data and software for UE 12 (FIG. 1) to perform these actions.

In one configuration, for example, the apparatus 810 for wireless communication includes means for obtaining relative synchronization information between a first radio access technology and a second radio access technology, and means for determining a measurement gap duration and measurement gap location based on the relative synchronization information so as to encompass a pilot of the second radio access technology. In one aspect, the aforementioned means may be the processor 840 (FIG. 8) configured to perform the functions recited by the aforementioned means. In another aspect, the aforementioned means may be a module, instructions stored on a computer-readable medium, or any apparatus, such as gap determiner component 108, configured to perform the functions recited by the aforementioned means.

In another configuration, for example, the apparatus 850 for wireless communication includes means for obtaining relative synchronization information between a first radio access technology and a second radio access technology, and means for determining a measurement gap duration and measurement gap location based on the relative synchronization information so as to encompass a pilot of the second radio access technology. In one aspect, the aforementioned means may be the processor 890 (FIG. 8) configured to perform the functions recited by the aforementioned means. In another aspect, the aforementioned means may be a module, instructions stored on a computer-readable medium, or any apparatus, such as gap determiner component 108, configured to perform the functions recited by the aforementioned means.

It is noted that RAT1 14 (FIG. 1) may include similar components, means or apparatus for obtaining relative synchronization information between a first radio access technology and a second radio access technology, and means for determining a measurement gap duration and measurement gap location based on the relative synchronization information so as to encompass a pilot of the second radio access technology, as described above with respect to RAT2 16 (FIG. 1) and/or with respect to apparatus 810 (FIG. 8).

Further, the above-described aspects may be utilized in an example use case (that should not be construed as limiting) where mobility (handover or reselection) between different radio access technologies (RATs) is required for one or more reasons. For example, fast Inter-RAT mobility is important to ensure service continuity and service setup success, particularly for Circuit Switched Fallback (CSFB), (see, e.g., CSFB, 3GPP TS23.272).

A UE typically carries out inter-RAT searches from LTE during measurement gaps which the LTE network opens up. In an aspect, these gaps are usually 6 ms in duration and can occur with a certain periodicity, e.g. 40 ms. The fewer the number of gaps used for acquisition, the faster the acquisition time and faster the corresponding voice call setup. In most cases (e.g., for LTE to GSM) the UE has to carry out a complete search assuming no known timing. In this case, the UE may need to utilize a lot of measurement gaps to search over all possible timing hypotheses, and to reject the resulting false alarms. In the case of TD-LTE and TD-SCDMA, however, both networks are synchronous and have the same pilot periodicity (namely 5 ms). Since both networks are synchronized using GPS or BeiDou, their pilots have a fixed time offset with respect to each other. According to the described aspects, the UE can take advantage of this structure to reduce the set of timing hypotheses it tests and to substantially reduce the acquisition and measurement time.

In some of the described aspects, however, in order to make a robust system, the UE may assume that the relative pilot location can change, although with low probability. For example, different bands may have different UL/DL partitioning and therefore have different relative timings. It is possible that different geographical areas (say cities) have different relative timings. Another example is if a particular base station (e.g., a femto cell) temporarily or permanently loses its timing source.

In order to achieve fast acquisition times in a robust manner, in such as use case, the UE may maintain a table or relational database of relative timing offsets between TD-LTE and TD-SCDMA as a function of the TD-LTE and TD-SCDMA bands. Such a table can be initialized, for example, through offline measurements (or can be initialized to all zeros). In an aspect, the UE can use this table to obtain fast TD-SCDMA measurements upon receiving a CSFB request. If the measurement fails, the UE can then resort to full search. Since the table or relational database is expected to be accurate almost all the time, the initial measurement is expected to succeed and thus achieve fast acquisition/measurement times. In another option, the UE can perform a full TD-SCDMA cell-search with low periodicity (e.g., once every few minutes) when camped on TD-LTE in order to update the UE table. Utilizing this option will have minimal impact on UE battery life while ensuring that the UE's synchronization table or relational database stays up-to-date.

The above solutions may provide fast acquisition/measurement between TD-LTE to TD-SCDMA, or vice-versa, while still being robust to occasional changes in the relative timing. It is noted that different bands may be assumed to have independent timing. In a further aspect, the described apparatus and methods may have improved reliability at the expense of additional complexity by making the table or relational database include the relative timing as a function of geographical location as well.

It is noted that the described efficient search procedure can be used for any mobility between synchronous networks, not just for the purpose of CSFB. For example, the described aspects could be used for idle reselection from TD-SCDMA to TD-LTE, or vice-versa. In this case, the shorter search time will lead to better battery life. Another mobility example includes a Packet-Switched Handover (PSHO) from TD-LTE to TD-SCDMA, or vice-versa.

Alternatively, or in addition, the described aspects may further take advantage of the timing synchronization information to reduce the measurement gap duration opened up in the TD-LTE waveform. Typically, measurement gaps in LTE are of a 6 ms duration, which are needed in order to contain one whole subframe of 5 ms for TD-SCDMA or UMTS. Since one whole 5 ms subframe is contained in the measurement gap, this configuration can assure that there will be at least one pilot instance in the measurement gap. According to the described aspects, however, if the pilot timing offset between the two networks is known, then a much smaller gap, e.g. 1 ms, may be utilized and can still encompass the pilot signal. In this case, the use of a shorter measurement gap duration by the described aspects leads to lower throughput loss on the TD-LTE system.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform. Additionally, at least one processor may comprise one or more modules, at least of which comprises hardware, operable to perform one or more of the steps and/or actions described above.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium operable to cause a computer to perform a function. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register). Additionally, in some aspects, the steps and/or actions of a method or algorithm may reside as one or any combination or set of codes and/or instructions on a machine readable medium and/or computer readable medium, which may be incorporated into a computer program product, and which may be non-transitory.

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of radio access technology searching, comprising:
   obtaining, by a processor, relative synchronization information between a first radio access technology and a second radio access technology;
   performing, at a relatively low periodicity, a full system acquisition search to obtain updated relative synchronization information;
   updating the relative synchronization information with the updated relative synchronization information obtained from the full system acquisition search; and
   determining a time location of a pilot signal of the second radio access technology based on the updated relative synchronization information.

2. The method of claim 1, further comprising searching for the pilot signal of the second radio access technology using the determined time location.

3. The method of claim 2, wherein the searching is triggered by a mobility trigger that comprises a circuit switched fall back (CSFB), a handover of a communication session, or an idle mode cell reselection.

4. The method of claim 2, further comprising:
   determining that the searching based on the determined time location comprises a failed search; and
   performing a full system acquisition search in response to the determined failed search.

5. The method of claim 2, wherein the searching based on the determined time location results in finding the pilot signal of the second radio access technology using fewer measurement gaps as compared to another search not utilizing the updated relative synchronization information.

6. The method of claim 1, wherein the relative synchronization information and the updated relative synchronization information comprise a relative pilot offset between the first radio access technology and the second radio access technology.

7. The method of claim 1, wherein one or both of the relative synchronization information and the updated relative synchronization information is band specific or is location specific.

8. The method of claim 1, further comprising:
   determining a measurement gap duration and measurement gap location based on one or both of the relative synchronization information and the updated relative synchronization information so as to encompass the pilot of the second radio access technology.

9. The method of claim 8, wherein obtaining the relative synchronization information further comprises receiving the relative synchronization information from one or more user equipment.

10. The method of claim 8, wherein the measurement gap duration is less than a pilot periodicity of the pilot of the second radio access technology.

11. The method of claim 1, wherein obtaining the relative synchronization information comprises reading the relative synchronization information from a memory, wherein the memory is preconfigured to store the relative synchronization information.

12. The method of claim 11, wherein updating the relative synchronization information comprises replacing the relative synchronization information with the updated relative synchronization information in the memory.

13. A non-transitory computer-readable medium storing computer-executable code, comprising:
   code for obtaining, by a processor, relative synchronization information between a first radio access technology and a second radio access technology;
   code for performing, at a relatively low periodicity, a full system acquisition search to obtain updated relative synchronization information;
   code for updating the relative synchronization information with the updated relative synchronization information obtained from the full system acquisition search; and
   code for determining a time location of a pilot signal of the second radio access technology based on the updated relative synchronization information.

14. The non-transitory computer-readable medium of claim 13, wherein the computer-executable code further comprises code for searching for the pilot signal of the second radio access technology using the determined time location.

15. The non-transitory computer-readable medium of claim 13, wherein the computer-executable code further comprises code for determining a measurement gap duration and measurement gap location based on one or both of the relative synchronization information and the updated relative synchronization information so as to encompass the pilot of the second radio access technology.

16. An apparatus for radio access technology searching, comprising:
   means for obtaining, by a processor, relative synchronization information between a first radio access technology and a second radio access technology;
   means for performing, at a relatively low periodicity, a full system acquisition search to obtain updated relative synchronization information;
   means for updating the relative synchronization information with the updated relative synchronization information obtained from the full system acquisition search; and
   means for determining a time location of a pilot signal of the second radio access technology based on the updated relative synchronization information.

17. The apparatus of claim 16, further comprising means for searching for the pilot signal of the second radio access technology using the determined time location.

18. The apparatus of claim 16, further comprising means for determining a measurement gap duration and measurement gap location based on one or both of the relative synchronization information and the updated relative synchronization information so as to encompass the pilot of the second radio access technology.

19. An apparatus for radio access technology searching, comprising:
   at least one processor; and
   a memory coupled to the at least one processor,
   wherein the at least one processor is configured to:
      obtain relative synchronization information between a first radio access technology and a second radio access technology;
      perform, at a relatively low periodicity, a full system acquisition search to obtain updated relative synchronization information;
      update the relative synchronization information with the updated relative synchronization information obtained from the full system acquisition search; and
      determine a time location of a pilot signal of the second radio access technology based on the relative synchronization information.

20. The apparatus of claim 19, wherein the at least one processor is further configured to search for the pilot signal of the second radio access technology using the determined time location.

21. The apparatus of claim 20, wherein the at least one processor is further configured to search based on a mobility trigger that comprises a circuit switched fall back (CSFB) or an idle mode cell reselection.

22. The apparatus of claim 20, wherein the at least one processor is further configured to:
   determine that the search based on the determined time location comprises a failed search; and
   perform a full system acquisition search in response to the determined failed search.

23. The apparatus of claim 20, wherein the search based on the determined time location results in finding the pilot signal of the second radio access technology using fewer measurement gaps as compared to another search not utilizing the updated relative synchronization information.

24. The apparatus of claim 19, wherein the relative synchronization information and the updated relative synchronization information comprise a relative pilot offset between the first radio access technology and the second radio access technology.

25. The apparatus of claim 19, wherein one or both of the relative synchronization information and the updated relative synchronization information is band specific or is location specific.

26. The apparatus of claim 19, wherein the at least one processor is further configured to determine a measurement gap duration and measurement gap location based on one or both of the relative synchronization information and the updated relative synchronization information so as to encompass the pilot of the second radio access technology.

27. The apparatus of claim 26, wherein the at least one processor is further configured to obtain the relative synchronization information from one or more user equipment.

28. The apparatus of claim 26, wherein the measurement gap duration is less than a pilot periodicity of the pilot of the second radio access technology.

* * * * *